(12) United States Patent	(10) Patent No.: US 7,656,117 B2
Hoadley et al.	(45) Date of Patent: Feb. 2, 2010

(54) SYSTEM AND METHOD FOR PRECHARGING PASSIVE HARMONIC FILTERS

(75) Inventors: Frederick L. Hoadley, Mequon, WI (US); John T. Strelcher, Ixonia, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 422 days.

(21) Appl. No.: 11/755,411

(22) Filed: May 30, 2007

(65) Prior Publication Data

US 2008/0298097 A1 Dec. 4, 2008

(51) Int. Cl.
 *H02P 27/04* (2006.01)
(52) U.S. Cl. .................. 318/802; 318/727; 318/807
(58) Field of Classification Search .......... 318/802, 318/727, 807, 818, 827, 629; 363/40, 39, 363/37; 323/288
 See application file for complete search history.

(56) References Cited

U.S. PATENT DOCUMENTS

2004/0051513 A1* 3/2004 Rupp et al. ................. 323/288

OTHER PUBLICATIONS

Allen-Bradley, Bulletin 100Q-Capacitor-Switching Contactors.

* cited by examiner

*Primary Examiner*—Karen Masih
(74) *Attorney, Agent, or Firm*—Quarles & Brady LLP; Alexander R. Kuszewski

(57) ABSTRACT

A system and method for precharging a harmonic filter connected to a power supply line to receive AC power and deliver the AC power to the motor drive unit includes a control circuit. The control circuit is configured to monitor an operational state of the motor drive unit or the power supply line, and generate a first control signal upon a predetermined change in the operational state and a second control signal delayed from the first control signal. The system also includes a charging circuit having a first switch configured to actuate in response to the first control signal to provide a reduced power to at least a portion of the harmonic filter and a second switch configured to actuate in response to the second control signal to provide a non-reduced power to the at least a portion of the harmonic filter.

20 Claims, 5 Drawing Sheets

SYSTEM AND METHOD FOR PRECHARGING PASSIVE HARMONIC FILTERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to motor drive systems and, more particularly, to a system and method for precharging components of a filter arranged to reduce harmonics injected onto AC power lines when operating a motor drive unit.

Often, power delivered from a power source or supply is not properly conditioned for consumption. For example, power plants are linked to power consuming facilities (e.g., buildings, factories, etc.) via utility grids that are designed to be extremely efficient at delivering massive amounts of power. To facilitate efficient distribution, power is delivered over long distances as fixed frequency three-phase alternating current (AC) power. As such, the power must typically be converted or "conditioned" prior to consumption.

For example, motors and their associated loads are one type of common inductive load employed at many consuming facilities that require power conditioning. When a motor is the consuming point, power "conditioning" systems are utilized to convert the fixed frequency AC power delivered over utility grids to a form suitable for driving the motor. To this end, power conditioning for motor systems typically include AC-to-DC (direct current) rectifiers that convert the utility AC power to DC power applied to positive and negative DC buses (i.e. across a DC link). The power distributed across the DC buses is then converted, for example, by use of an inverter, to AC power designed to drive the motor.

Specifically, referring to FIG. 1, the present invention will be described with respect to a motor system 10. The motor system 10 generally includes a power supply 12, a motor drive unit 14, and a motor 16. The power supply 12 provides power to the motor drive unit 14 that, in turn, converts the power to a more usable form for the motor 16 that drives an associated load 18.

The motor drive unit 14 includes a variety of components, such as a rectifier 20, an inverter 22, and a controller 24. During operation, the power supply 12 provides three-phase AC power, for example, as received from a utility grid over transmission power lines 26. However, it is also contemplated that the power supply 12 may deliver single-phase power. The rectifier 20 is designed to receive the AC power from the power supply 12 and convert the AC power to DC power that is delivered to positive and negative DC buses 28, 30 of a DC link 32. Specifically, the rectifier 20 includes a plurality of switches (e.g., diodes or silicon controlled rectifiers) to rectify the AC power received from the AC power lines 26.

The DC power is delivered from the rectifier 20 over the positive and negative DC buses 28, 30 to the inverter 22. The inverter 22 includes a plurality of switching devices (e.g., IGBTs or other semiconductor switches) that are positioned between the positive and negative buses 28, 30 and controlled by the controller 24 to open and close specific combinations of the switches to sequentially generate pulses on each of the supply lines 34 to drive the motor 16 and, in turn, the load 18 through a drive shaft 36.

While use of the rectifier 20 is an efficient means for converting the AC power received from the power lines 26 to DC power, harmonic currents made up of interger multiples of the power line frequency will be injected onto the power lines 26 as a result. These injected harmonic currents can adversely affect operation of the motor drive unit 14 and other systems connected to the power supply 12.

As a result, a filter 38 is often arranged between the power supply 12 and the motor drive unit 14. Typically, a passive filter 38 is arranged to suppress the harmonic currents injected onto the power lines 26 by operation of the rectifier 20 of the motor drive unit 14. The filter 38 often includes at least a first stage reactor 39 and a number of capacitors 40 that, at least partially, forms a second stage 41. When the motor drive unit 14 is stopped or operating at a low load, the passive filter 38 draws a significant leading power factor (pf) current due to the inclusion of capacitors 40 contained within the filter 38. Hence, the filter 38 acts as a leading pf load to the power supply 12. This can be particularly problematic if the power supply 12 includes backup generators that are ill equipped to handle a leading pf load.

One solution to this problem is to monitor the operation of the motor drive unit 14 and use a relay 42 to control operation of the capacitors 40. The relay 42 is configured to control a plurality of switches 44 to disconnect the capacitors 40 in the filter 38 when the motor drive unit 14 is stopped or operating below a predetermined speed or load. However, when reconnecting the capacitors 40 into the filter 38, the motor drive unit 14 may experience an overvoltage fault. Such overvoltage faults can generally be avoided if the voltage rating of the motor drive unit 14 is greater than the rated line voltage, for example, using a motor drive unit 14 rated for 480V on a 400V system. However, such over-rating can significantly raise the cost of the system.

It would, therefore, be desirable to have a system and method for filtering harmonics without drawing a leading pf current under some conditions or causing an overvoltage fault in other conditions and without the need to use over-rated components.

BRIEF SUMMARY OF THE INVENTION

The present invention overcomes the aforementioned drawbacks by providing a system and method for disconnecting the capacitors in a filter system to avoid drawing a leading pf current when the associated motor system is stopped or at low speeds, and precharging the capacitors before reconnection of the capacitors to avoid causing an overvoltage fault. This system and method avoids overvoltage faults caused by reconnecting the capacitors without the need to use over-rated components.

In accordance with one aspect of the present invention, a system for precharging a harmonic filter connected to a power supply line to receive AC power and deliver the AC power to the motor drive unit is disclosed. The system includes a control circuit configured to monitor an operational state of the motor drive unit or the power supply line and generate a first control signal upon a predetermined change in the operational state and a second control signal delayed from the first control signal. The system also includes a charging circuit having a first switch configuration configured to actuate in response to the first control signal to provide a reduced power to at least a portion of the harmonic filter and a second switch configuration configured to actuate in response to the second control signal to provide a non-reduced power to at least a portion of the harmonic filter.

In accordance with another aspect of the present invention, a system for precharging a harmonic filter connected to a power supply line to receive AC power and deliver the AC power to the motor drive unit is disclosed. The system includes a monitoring device configured to monitor the motor drive unit or the power supply line and communicate a reconnect control signal based on an operational state of the motor drive unit or the power supply line. The system also includes a charging circuit configured to selectively connect a portion of the harmonic filter to the power supply line to receive a first percentage of the AC power or second percentage of the AC power. A control circuit is included that is configured to receive the reconnect control signal from the monitoring device and, responsive thereto, control the charging circuit to connect the portion of the harmonic filter to receive the first percentage of the AC power and the second percentage of the AC power according to a reconnect control sequence configured to sequentially increase a percentage of the AC power delivered to the harmonic filter.

In accordance with yet another aspect of the invention, a method of precharging a harmonic filter connected to a power supply line to receive AC power and deliver the AC power to the motor drive unit is disclosed. The method includes monitoring an operational parameter of the motor drive unit and generating a first control signal upon the operational parameter passing a threshold and a second control signal delayed from the first control signal. Additionally, the method includes closing a first switch configuration in response to the first control signal to provide a reduced power to at least a portion of the harmonic filter and closing a second switch configuration in response to the second control signal to provide a non-reduced power to the at least a portion of the harmonic filter.

In accordance with still another aspect of the invention, a motor drive unit is disclosed that includes a passive harmonic filter including at least one capacitive device configured to receive AC power from a power supply line, a rectifier configured to receive the AC power from the passive harmonic filter and convert the AC power to DC power, and an inverter configured to receive the DC power from the rectifier and convert the DC power to pulses configured to drive a motor. The motor drive system also includes a precharging circuit including a first switch configured to selectively connect the at least one capacitive device directly to the power supply line and a second switch configured to selectively connect the at least one capacitive device to the power supply line through a resistive network. Additionally, the motor drive system includes a control circuit configured to control the precharging circuit to sequentially connect the at least one capacitive device to the power supply line through the second switch and the resistive network to precharge the at least one capacitive device before connecting the at least one capacitive device to the power supply lines through the first switch to filter the AC power.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
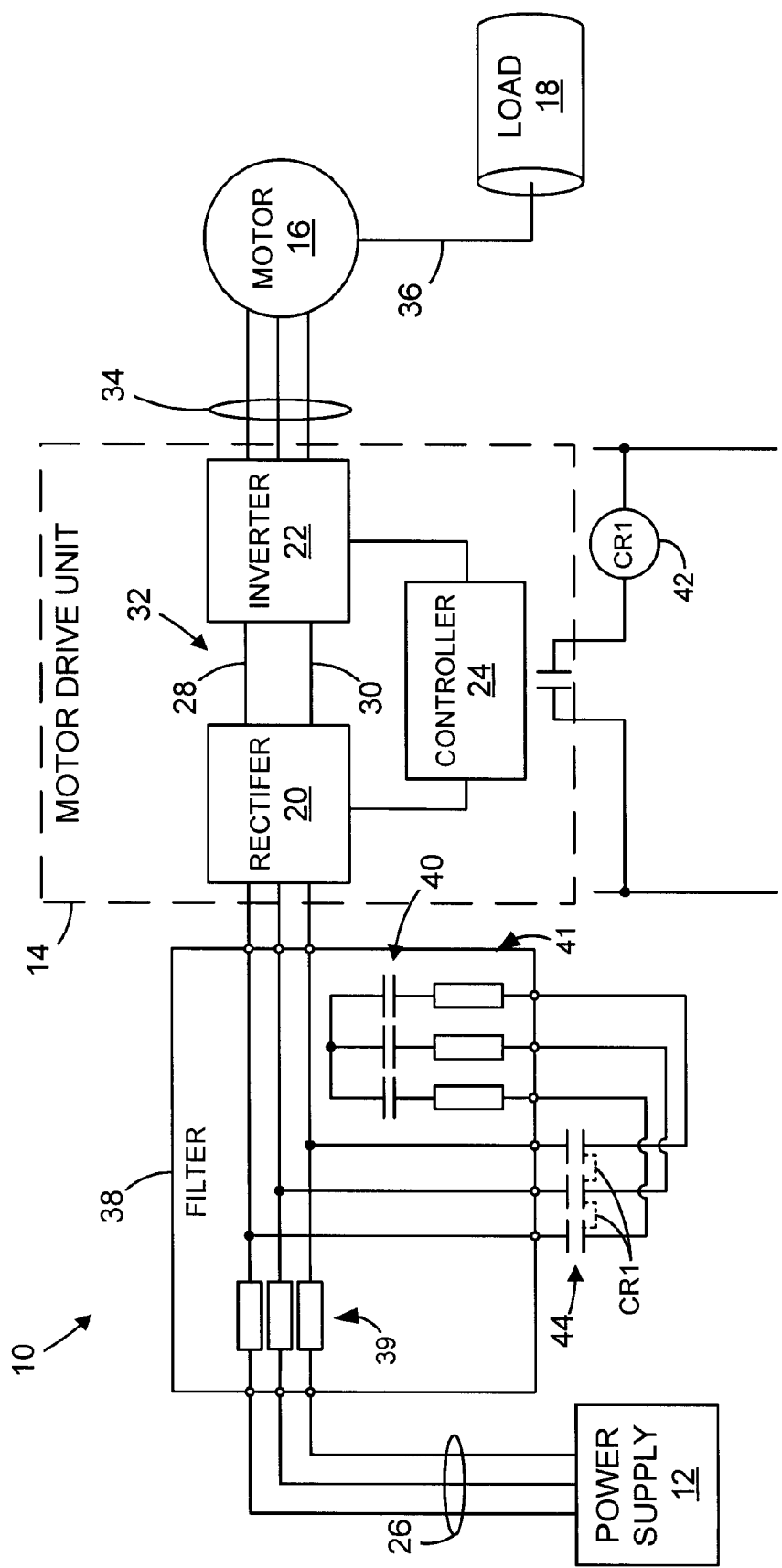
FIG. 1 is a schematic diagram of a motor system and associated traditional harmonic filter circuit and switching system.
Figure 2:
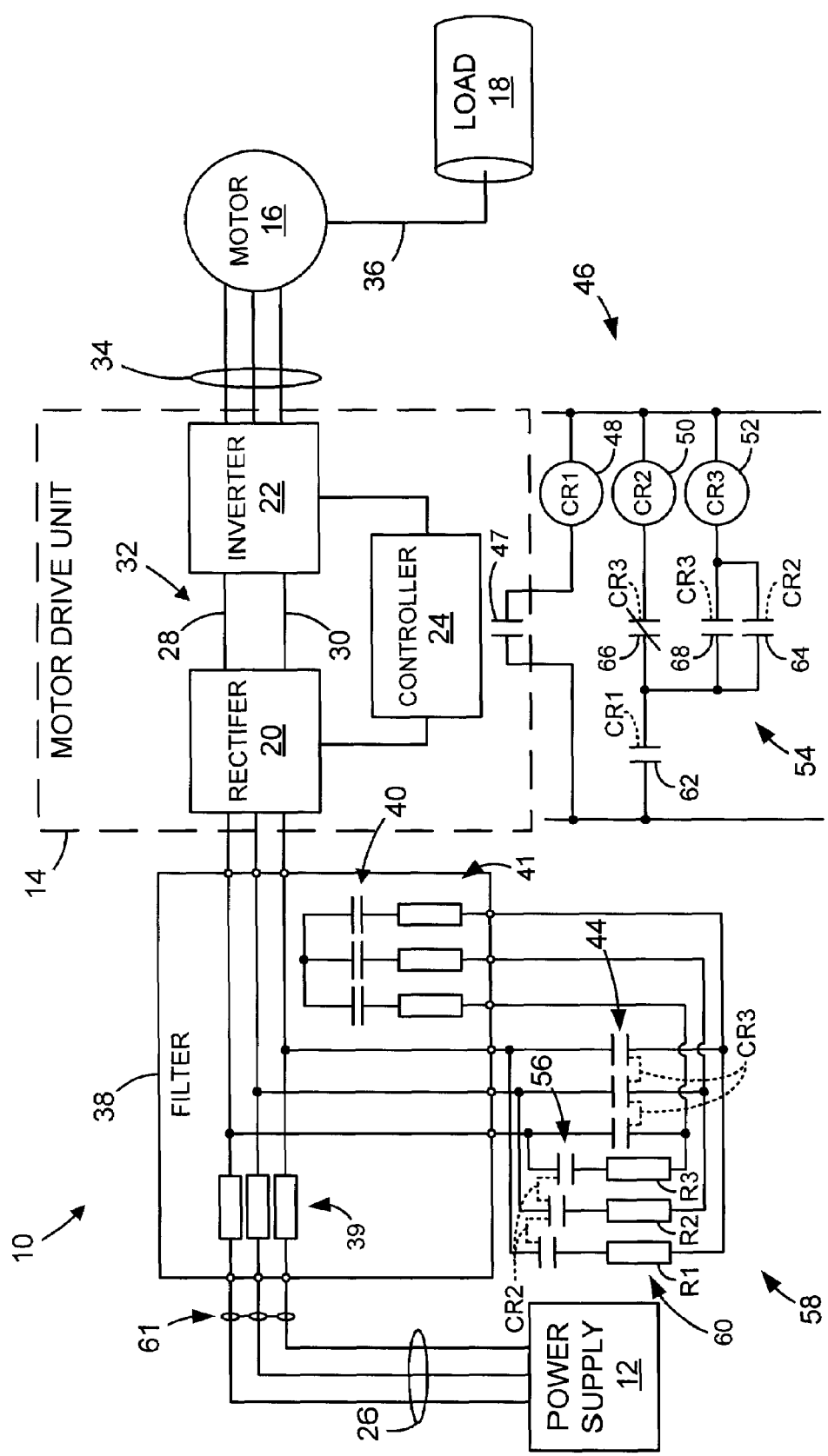
FIG. 2 is a schematic diagram of a motor system, associated harmonic filter, and a combined control and precharging system in accordance with the present invention.

Referring now to FIG. 2, to overcome the drawbacks addressed above, the above-described relay 42 and switch 44 system of FIG. 1 is replaced with an expanded system configured to incrementally charge the capacitors 40. Specifically, the single relay 42 of FIG. 1 is replaced with a control circuit 46 including multiple control elements 48, 50, 52 that control multiple switches 54 within the control circuit 46 and multiple switches 44, 56 within a charging circuit 58. Like the system described above with respect to FIG. 1, the charging circuit 58 includes switches 44 configured to quickly connect and disconnect the capacitors 40 from the supply lines 26. However, in addition, the charging circuit 58 includes another set of switches 56 and an array of resistors 60 that, as will be described, are controlled to precharge the capacitors 40 prior to reconnecting the capacitors 40 to the supply lines through switches 44.

In operation, the control circuit 46 is controlled by a control contact 47. The control contact 47 may be a run contact that is configured to close once the motor drive unit 14 is running or may be a threshold contact that closes upon detecting an operational parameter of the motor drive unit 14 corresponding to a predetermined threshold. Furthermore, it is contemplated that a controller, for example, the controller 24 of the motor drive unit 14, may be used to control the control contact 47. In this regard, the controller may dynamically control the control contact 47 based on one or more criterion.

For example, it is contemplated that the control contact 47 may be actuated when the operational frequency of the motor drive unit 14 is greater than a minimum value or when power components, for example, the power factor, seen on the input lines 26 drops below a specific value or exceeds a threshold. In the later case, it is contemplated that a current sensor or other monitoring circuit 61 may be employed. Additionally, it is contemplated that the monitoring system may have an inherent hysteresis designed to avoid changing the state of the control contact 47 in response to minor or momentary variations in operational parameters.

In the illustrated configuration, by default, the capacitors 40 are disconnected from the supply lines 26. Upon closing the control contact 47, the first control relay 48 causes one of the switches 62 in the control circuit 46 to close, as indicated by control marker CR1. Responsive thereto, the second control relay 50 causes another switch 64 in the control circuit 46 and a first set of switches 56 in the charging circuit 58 to close, as indicated by control marker CR2. Accordingly, the capacitors 40 are connected to the supply lines 26 through a resistive network 60 that limits the voltage seen by the capacitors 40 upon closing switches 56. It is contemplated that each resistor R1, R2, R3, or equivalent resistor, in the resistive network should have a value approximately 0.3 to 0.5 of the impedance valve of the capacitors 40. However, it is contemplated that these values may vary based on system constraints and operating conditions. Furthermore, zero-crossing circuitry and SCRs may be utilized.

The closing of switch 64 in the control circuit 46 causes the third control relay 52 to open a normally closed switch 66 and close another normally open switch 68 in the control circuit 46. Furthermore, the third control relay 52 closes switches 44 in the charging circuit 58 to connect the capacitors 40 directly to the supply lines 26. By doing so, the second relay 50 reopens switch 64 in the control circuit 46 and switches 56 in the charging circuit 58.

Figure 3:
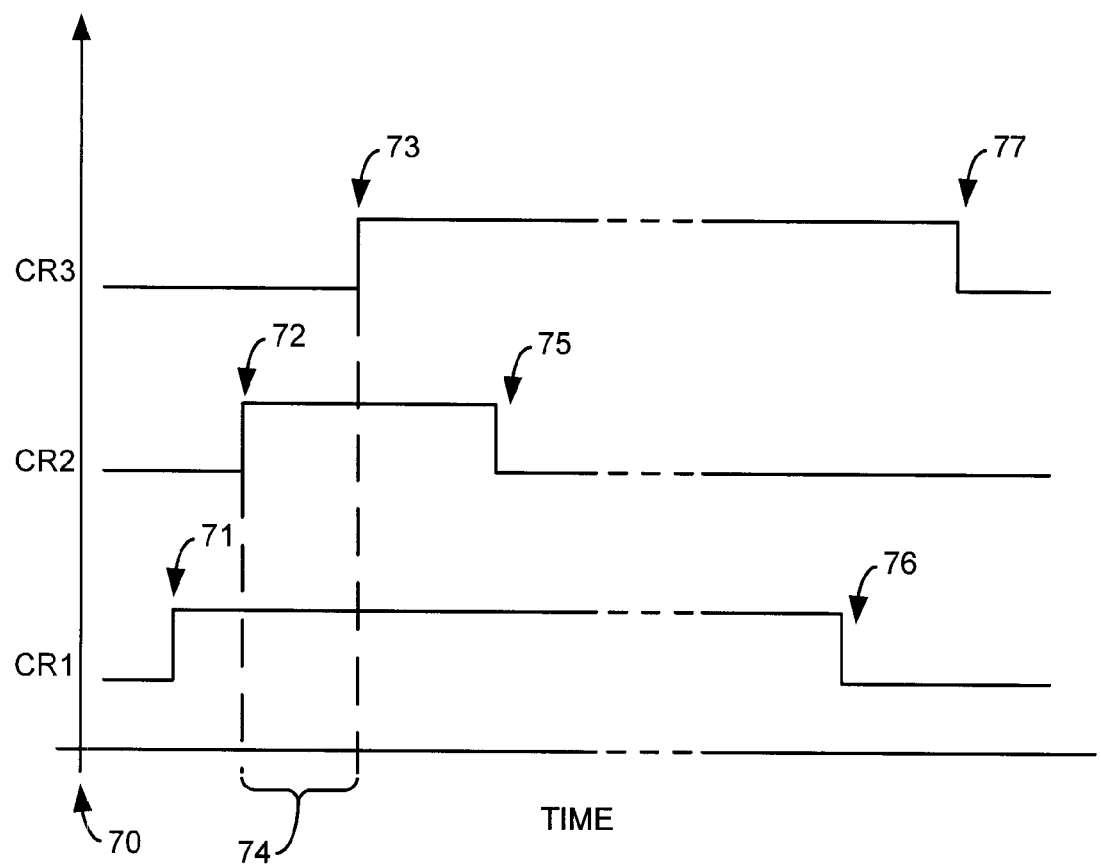
FIG. 3 is a diagram of the control signals generated by the control system of FIG. 2.

The affect of this sequential process of opening and closing contacts generates an incremented control algorithm, as illustrated in FIG. 3. Specifically, referring to FIGS. 2 and 3, at time zero 70 the control signals from the three relays 48, 50, 52 of FIG. 2 are "low," which corresponds to each switch being in the default position. At a time thereafter when the control switch 47 of FIG. 2 closes, the control signal CR1 generated by the first control relay 48 changes to "high" 71 to thereby actuate the switch 62 controlled by the first relay 48. As described above, thereafter, the second control relay 50 changes the control signal CR2 to "high" 72 to thereby actuate all switches 56, 64 controlled by the second relay 50. Accordingly, the capacitors 40 are connected to the supply lines 26 through a resistive coupling 60. In this regard, the capacitors 40 begin charging with a reduced voltage with respect to the supply lines 26. Thereafter, the third control relay 52 changes the control signal CR3 to "high" 73, which connects the capacitors 40 directly to the supply lines 26. Hence, a precharge period 74 is created when the capacitors 40 are supplied with a reduced power. It is contemplated that this precharge timing period 74 may be accomplished mechanically by a capacitor switching contactor, such as a 100Q capacitor switching contactor commercially available from Rockwell Automation, Inc. Thereafter, the second relay 50 causes the control signal CR2 to return to "low" 75. The control signals CR1, CR2, and CR3 remain in these states 71, 73, 75 until an event causes the control contact 47 to reopen, which, in turn, causes control signal CR1 to return to "low" 76 and, thereafter, control signal CR3 to return to "low" 77. The return of control signal CR3 to "low" 77 causes switches 44 to open and disconnect the capacitors 40 from the supply lines 26.

Figure 4:
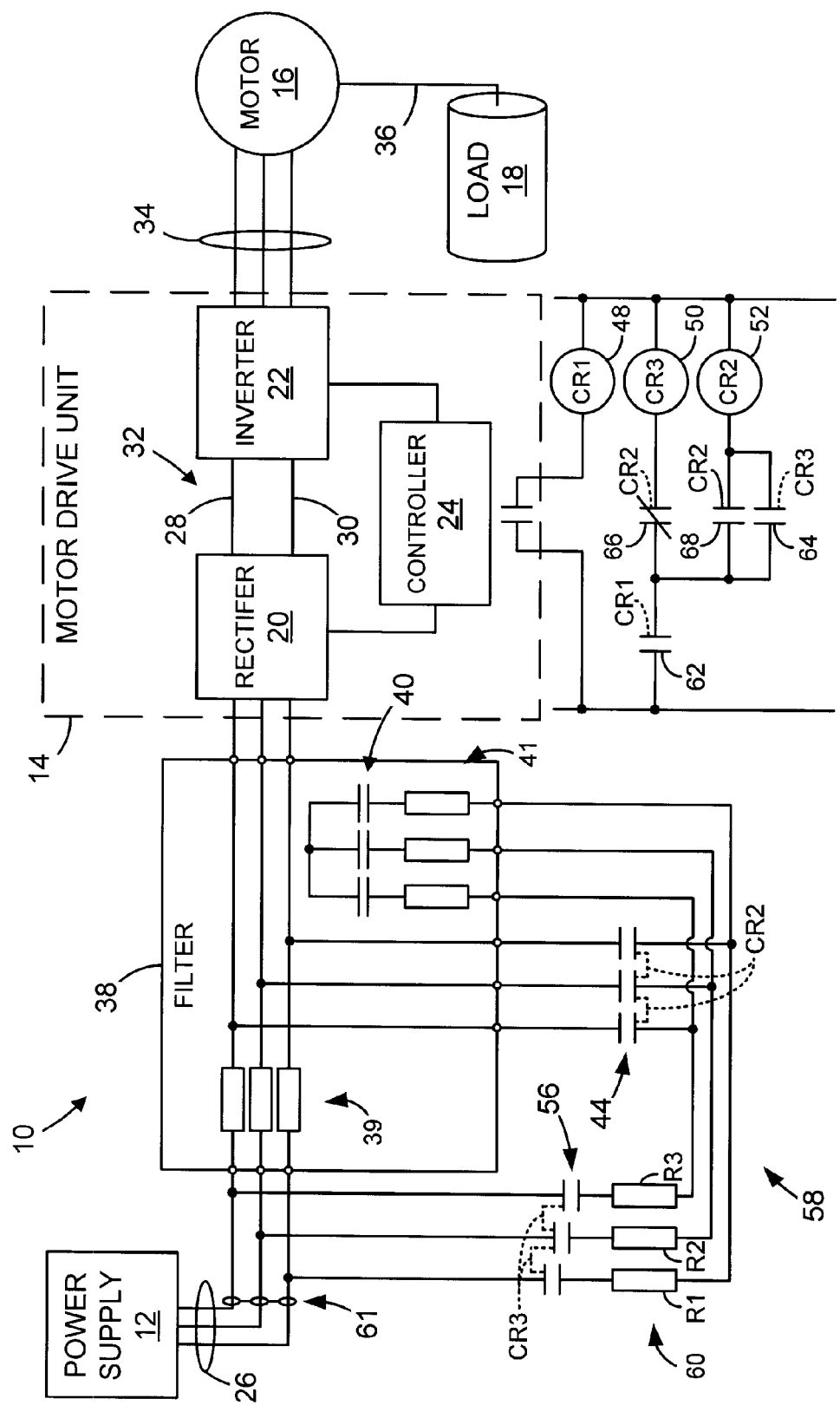
FIG. 4 is a schematic diagram of a motor system, associated harmonic filter, and another combined control and precharging system in accordance with the present invention.

Referring now to FIG. 4, a variety of modifications are contemplated. For example, the connection of the switches 56 and resistive couplings 60 to the capacitors 40 may bypass the first stage 39 of the filter 38 and connect directly to the supply lines 26. In this case, it is contemplated that each resistor R1, R2, R3 or equivalent resistor in the resistive network should have a value of approximately 0.1 to 0.3 of the value of the impedance of the capacitors 40. However, it is contemplated that these values may vary based on system constraints and operating conditions.

Figure 5:
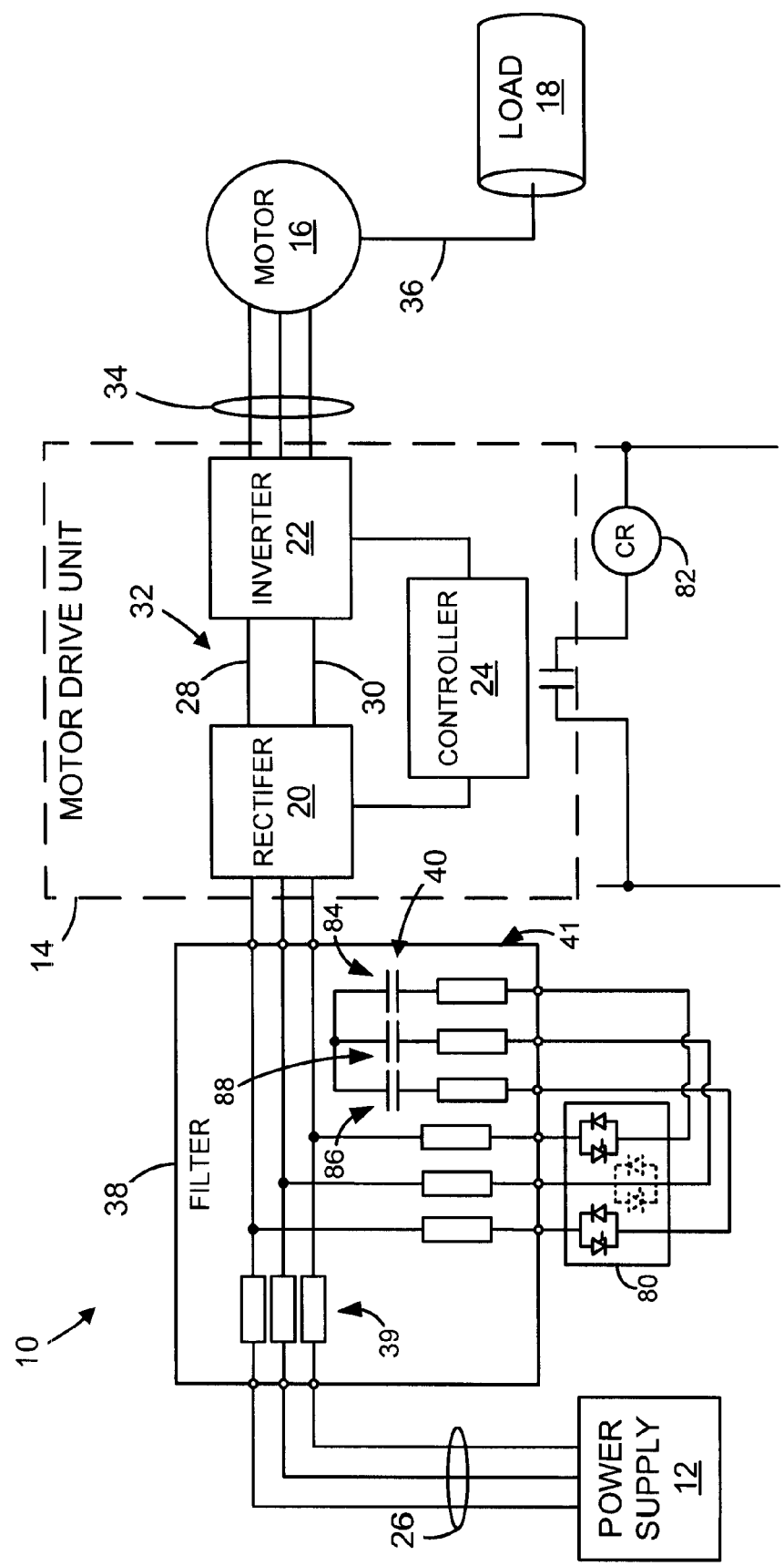
FIG. 5 is a schematic diagram of a motor system, associated harmonic filter, and another combined control and precharging system including a zero-crossing circuit and control in accordance with the present invention.

Referring now to FIG. 5, the charging circuit may include a zero-crossing switch network 80 is controlled by zero-crossing control circuit 82 to selectively and sequentially connect each of two of the capacitors 84, 86 to the power supply line 26 at a time when a phase voltage is crossing a zero value. It is contemplated that the third capacitor 88 of the filter 38 may be always connected, or may be connected with the first of the two zero-crossing switches is connected.

Therefore, an incremental system for connecting the capacitors of a passive harmonic filter is provided to substantially avoid or, at least, reduce a "ring-up" of the bus voltage that can cause the motor drive unit to trip due to an overvoltage condition. It is contemplated that the initiation of the incremental switching process may be initiated based on a wide variety of criterion. For example, the criterion may include running/stopping of the motor drive unit; a minimum operational load of the motor drive unit, motor, or load; and/or a minimum line power component. In each case, the inherent switching delays of the switches and relays may be advantageously used to create a desired precharging period and/or hysteresis.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A system for precharging a harmonic filter connected to a power supply line to receive AC power and deliver the AC power to the motor drive unit, the system comprising:
   a control circuit configured to monitor an operational state of at least one of the motor drive unit and the power supply line and generate a first control signal upon a predetermined change in the operational state and a second control signal delayed from the first control signal; and
   a charging circuit having a first switch configuration configured to actuate in response to the first control signal to provide a reduced power to at least a portion of the harmonic filter and a second switch configuration configured to actuate in response to the second control signal to provide a non-reduced power to the at least a portion of the harmonic filter.

2. The system of claim 1 wherein the charging circuit includes a resistive device configured to receive power from the power supply lines and create the reduced power.

3. The system of claim 2 wherein the resistive device is connected directly to the power supply lines through the first switch configuration.

4. The system of claim 2 wherein the harmonic filter includes a first filtering stage connected between the resistive device and the power supply lines.

5. The system of claim 1 wherein the predetermined change in the operational state includes at least one of a low-load condition of the motor drive unit, a stopped condition of the motor drive unit, and a drop in line current across the power supply lines.

6. The system of claim 1 wherein the control circuit includes a plurality of switches and a plurality of control relays configured to control the plurality of switches to delay the second control signal from the first control signal.

7. A system for precharging a harmonic filter connected to a power supply line to receive AC power and deliver the AC power to the motor drive unit, the system comprising:
   a monitoring device configured to monitor at least one of the motor drive unit and the power supply line and communicate a reconnect control signal based on an operational state of the at least one of the motor drive unit and the power supply line;
   a charging circuit configured to selectively connect a portion of the harmonic filter to the power supply line to receive at least one of a first percentage of the AC power and second percentage of the AC power; and
   a control circuit configured to receive the reconnect control signal from the monitoring device and, responsive thereto, control the charging circuit to connect the portion of the harmonic filter to receive the first percentage of the AC power and the second percentage of the AC power according to a reconnect control sequence configured to sequentially increase a percentage of the AC power delivered to the harmonic filter.

8. The system of claim 7 wherein the charging circuit includes a plurality of switches configured to selectively connect the portion of the harmonic filter to receive at least one of a first percentage of the AC power and second percentage of the AC power.

9. The system of claim 8 wherein the charging circuit is further configured to generate a first control signal configured to cause a portion of the plurality of switches to connect the portion of the harmonic filter to receive the first percentage of the AC power and generate a second control signal configured to cause a portion of the plurality of switches to connect the portion of the harmonic filter to receive the second percentage of the AC power.

10. The system of claim 7 wherein the monitoring device is configured to communicate the reconnect control signal upon detecting an operational state indicating at least a minimum-load condition of the motor drive unit.

11. The system of claim 7 wherein the charging circuit includes a resistive component configured to reduce a percentage of the AC power to provide the first percentage of AC power.

12. The system of claim 7 wherein the monitoring device is configured to communicate a disconnect control signal upon detecting an operational state indicating at least one of a low-load condition and a stopped condition of the motor drive unit and, responsive thereto, the control circuit is further configured to disconnect the portion of the harmonic filter from the power supply line.

13. The system of claim 7 wherein portion of the harmonic filter includes capacitive components.

14. A method of precharging a harmonic filter connected to a power supply line to receive AC power and deliver the AC power to the motor drive unit, the method comprising:
monitoring an operational parameter of the motor drive unit;
generating a first control signal upon the operational parameter passing a threshold and a second control signal delayed from the first control signal;
closing a first switch configuration in response to the first control signal to provide a reduced power to at least a portion of the harmonic filter; and
closing a second switch configuration in response to the second control signal to provide a non-reduced power to the at least a portion of the harmonic filter.

15. The method of claim 14 further comprising opening the first switch configuration in response to the second control signal.

16. A motor drive unit comprising:
a passive harmonic filter including at least one capacitive device configured to receive AC power from a power supply line;
a rectifier configured to receive the AC power from the passive harmonic filter and convert the AC power to DC power;
an inverter configured to receive the DC power from the rectifier and convert the DC power to pulses configured to drive a motor;
a precharging circuit including a first switch configured to selectively connect the at least one capacitive device directly to the power supply line and a second switch configured to selectively connect the at least one capacitive device to the power supply line through a resistive device;
a control circuit configured to control the precharging circuit to sequentially connect the at least one capacitive device to the power supply line through the second switch and the resistive device to precharge the at least one capacitive device before connecting the at least one capacitive device to the power supply lines through the first switch to filter the AC power.

17. The motor drive unit of claim 16 wherein the control circuit is further configured to control the precharging circuit to disconnect the at least one capacitive device from the power supply line by opening the first switch and the second switch upon detecting at least one of a low-load condition of the motor and a stopped condition of the motor.

18. The motor drive unit of claim 17 further comprising a monitoring circuit configured to monitor one of the rectifier, the inverter, and the motor to determine the at least one of a low-load condition of the motor and a stopped condition of the motor.

19. The motor drive unit of claim 16 wherein the control circuit includes a plurality of relays configured to control the first switch and the second switch to connect and disconnect the at least one capacitive component from the power supply line.

20. A motor drive unit comprising:
a passive harmonic filter including at least two capacitive devices configured to receive AC power from a power supply line;
a rectifier configured to receive the AC power from the passive harmonic filter and convert the AC power to DC power;
an inverter configured to receive the DC power from the rectifier and convert the DC power to pulses configured to drive a motor;
a charging circuit including a zero-crossing switch configured to selectively connect one of the at least two capacitive devices to the power supply line at a time when a phase voltage is crossing a zero value, and a second zero-crossing switch configured to selectively connect the another of the at least two capacitive devices to the power supply line at another time when another phase voltage is crossing a zero value;
a zero-crossing control circuit configured to control the charging circuit to sequentially connect the at least two capacitive devices to the power supply line when the phase voltages are crossing the zero values.

* * * * *